United States Patent
Henneken et al.

(10) Patent No.: US 6,529,813 B1
(45) Date of Patent: Mar. 4, 2003

(54) URBAN DRIVING OPERATING METHOD FOR AN ELECTRONICALLY CONTROLLED AUTOMATIC GEARBOX

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/807,775
(22) PCT Filed: Oct. 16, 1999
(86) PCT No.: PCT/EP99/07871
§ 371 (c)(1), (2), (4) Date: Apr. 16, 2001
(87) PCT Pub. No.: WO00/25045
PCT Pub. Date: May 4, 2000

(30) Foreign Application Priority Data

Oct. 24, 1998 (DE) .......................................... 198 49 060

(51) Int. Cl.$^7$ ................................................ B60K 41/02
(52) U.S. Cl. ........................ 701/56; 701/58; 701/61; 701/93; 477/46; 477/47; 477/175
(58) Field of Search .......................... 701/56, 55, 58, 701/62, 61, 93, 29, 36, 97, 99; 477/48, 46, 47, 175; 395/900; 123/319; 180/179, 170, 171, 178

(56) References Cited

U.S. PATENT DOCUMENTS

| | | | | |
|---|---|---|---|---|
| 5,235,876 A | * | 8/1993 | Minowa et al. | 74/866 |
| 5,390,117 A | | 2/1995 | Graf et al. | 364/424.1 |
| 5,557,521 A | | 9/1996 | Danz et al. | 364/424.1 |
| 5,748,472 A | * | 5/1998 | Gruhle et al. | 477/43 |
| 5,795,261 A | * | 8/1998 | Speicher et al. | 477/48 |
| 6,006,151 A | | 12/1999 | Graf | 701/57 |
| 6,052,644 A | * | 4/2000 | Murakami et al. | 701/93 |
| 6,188,946 B1 | * | 2/2001 | Suzuki et al. | 701/62 |

FOREIGN PATENT DOCUMENTS

| | | |
|---|---|---|
| DE | 42 15 406 A1 | 11/1993 |
| EP | 0 576 703 A1 | 1/1994 |
| EP | 0 694 138 B1 | 1/1996 |
| FR | 2 775 749 | 9/1999 |
| WO | 94/24464 | 10/1994 |
| WO | 97/25555 | 7/1997 |

* cited by examiner

Primary Examiner—Thomas G. Black
Assistant Examiner—Tuan C To
(74) Attorney, Agent, or Firm—Davis & Bujold, P.L.L.C.

(57) ABSTRACT

The invention relates to an urban driving operating method for an electronically controlled automatic transmission in which a driving speed characteristic (vf) is determined and it is possible to recognize an urban driving state when the driving speed characteristic (vf) is within a presettable value range with an upper limit and in which in addition a driving activity characteristic (FCOUNTER) is continuously determined. It is proposed according to the invention that the urban driving state be recognized when the driving activity characteristic (FCOUNTER) is also within a presettable value range with an upper limit and that a drive program optimized for the urban driving state be accessed.

13 Claims, 2 Drawing Sheets

URBAN DRIVING OPERATING METHOD FOR AN ELECTRONICALLY CONTROLLED AUTOMATIC GEARBOX

FIELD OF THE INVENTION

According to the preamble of the main claim, the invention relates to an urban driving operating method for an electronically controlled automatic transmission.

BACKGROUND OF THE INVENTION

During an urban driving operation or within closed places, special requirements exist for the gear change control of automatic transmissions. In the forefront stand criteria like improved comfort by infrequent shifting, a low noise emission or a reduced tendency to creeping whereas, particularly in highly motorized vehicles, it is possible to omit very high traction excesses. It can be convenient, e.g. in certain situations to prevent a downshift to the first gear, whereby the fuel consumption is lowered and, in addition, the tendency of creeping can be reduced in the standstill.

EP 0 694 138 B1 has disclosed a method for control of an automatic transmission in which, in an electronic unit for gear change control, several programs are stored which are accessed depending on a driving activity characteristic. According to the value of the driving activity characteristic, a consumption-optimized shift program, a performance-optimized shift program or shift programs lying therebetween are accessed. The urban driving state is recognized in this method when the vehicle speed is below a limit speed and when the frequency of starting operations, braking operations and load change exceeds a limit value. With this method, the urban driving state is very reliably recognized so that the transmission control reacts adequately. But it is a disadvantage that the urban driving state is also recognized during a sporting drive mode when the corresponding conditions are met so that, even if the driver really desires high acceleration, no corresponding shift program is available.

Therefore, this invention is based on the problem of making an urban driving operating method available where, during a sporting drive mode, higher priority is given to the driver's acceleration wish than to the other criteria applicable to urban driving operation.

SUMMARY OF THE INVENTION

According to the invention, the problem is solved by a method having the features as discussed below.

The urban driving state is, therefore, recognized when a driving speed characteristic is within a given range of values with an upper limit and also a driving activity characteristic is within a given range of values with an upper limit. The driving activity characteristic is formed in accordance, e.g. with a starting appraisal, a pedal activity appraisal, a longitudinal acceleration appraisal, a transverse acceleration appraisal or a kickdown appraisal. With the aid of the driving activity characteristic, a differentiation is made between a consumption-oriented and a performance-oriented sporting drive mode. A driving program optimized for the urban driving state is accessed only as long as the urban driving state is recognized, that is, only when the driving mode is rather consumption oriented. With the aid of the different rating criteria, if a sporting driver is recognized, the driving activity characteristic assumes higher values so that the urban driving state is no longer recognized and a performance-optimized driving program is rather accessed.

A driving program comprises the shift characteristic lines for gear change control, the same as the converter shift characteristic lines for control of a converter lock-up clutch.

The value ranges of the driving speed characteristic and of the driving activity characteristic can be kept separated from each other with firm upper and lower limit values. In a diagram where the driving speed characteristic is plotted above the driving activity characteristic, a rectangular range would have been thereby described. An advantageous possibility of describing the range, within which the urban driving state is recognized, is to determine an upper limit value of the driving speed characteristic below which the urban driving state is recognized according to the actual value of the driving activity characteristic wherein in particular to higher values of the driving activity lower limit values are assigned.

The standard of the range within which the urban driving state is recognized hereby becomes substantially more flexible.

In an advantageous development of the method, the driving speed characteristic is formed by a time-delaying filter from measured driving speed values. The signal curve is thereby stabilized.

It is advantageous to provide a strong delaying filter when the value of the filtered driving speed characteristic is higher than the actual driving speed value and to provide a less strong delaying filter when the value of the filtered driving speed characteristic is lower than the actual driving speed value. Proceeding from a high driving speed, the urban driving state is hereby recognized only with delay when the driving speed has fallen below the upper limit value. It is hereby prevented that a short drive at speeds below a limit value results in that the urban driving state be erroneously recognized. Conversely, proceeding from a low driving speed, the urban driving state is quickly abandoned when the driving speed has exceeded the limit value. In this manner it is possible, e.g. after the place end, to very quickly prepare a corresponding driving program again.

If the urban driving state is recognized only when the actual driving speed is higher than a lower driving speed limit value, the range within which the urban driving state has been detected can be further limited.

To prevent the urban driving state from being recognized at the beginning of a drive, it can be provided that the urban driving state is recognized only when in the same drive a minimum driving speed has been reached previously in time.

It is advantageous to put an upper limit for the admissible value range of the driving speed characteristic so that it can only assume values which are lower than a presettable maximum value. Hereby is obtained that the time period that lapses after driving in a closed place until the urban driving state is recognized depends less strongly on the previously driven speed.

In many modern transmission controls, the road gradient or an elevated tractional resistance is determined in order to access special driving programs starting from a specific road gradient. The driving programs prevent feared shifting oscillation. Therefore, it is advantageous to recognize the urban driving state only when the road gradient is within a presettable value range which comprises a level road.

In one other development of the invention, the number of braking operations per time interval is determined and the urban driving state is recognized only when the number of braking operations per time interval exceeds a presettable limit value.

Finally, it is proposed to detect the position of the vehicle, especially by means of a navigation system, and to establish by means of cartographic data whether the position is within a closed place and recognize the urban driving state only when the position is within a closed place.

BRIEF DESCRIPTION OF THE DRAWING(S)

The inventive method is explained, in detail below, with reference to the enclosed drawings wherein.

DETAILED DESCRIPTION OF THE INVENTION

Figure 1:
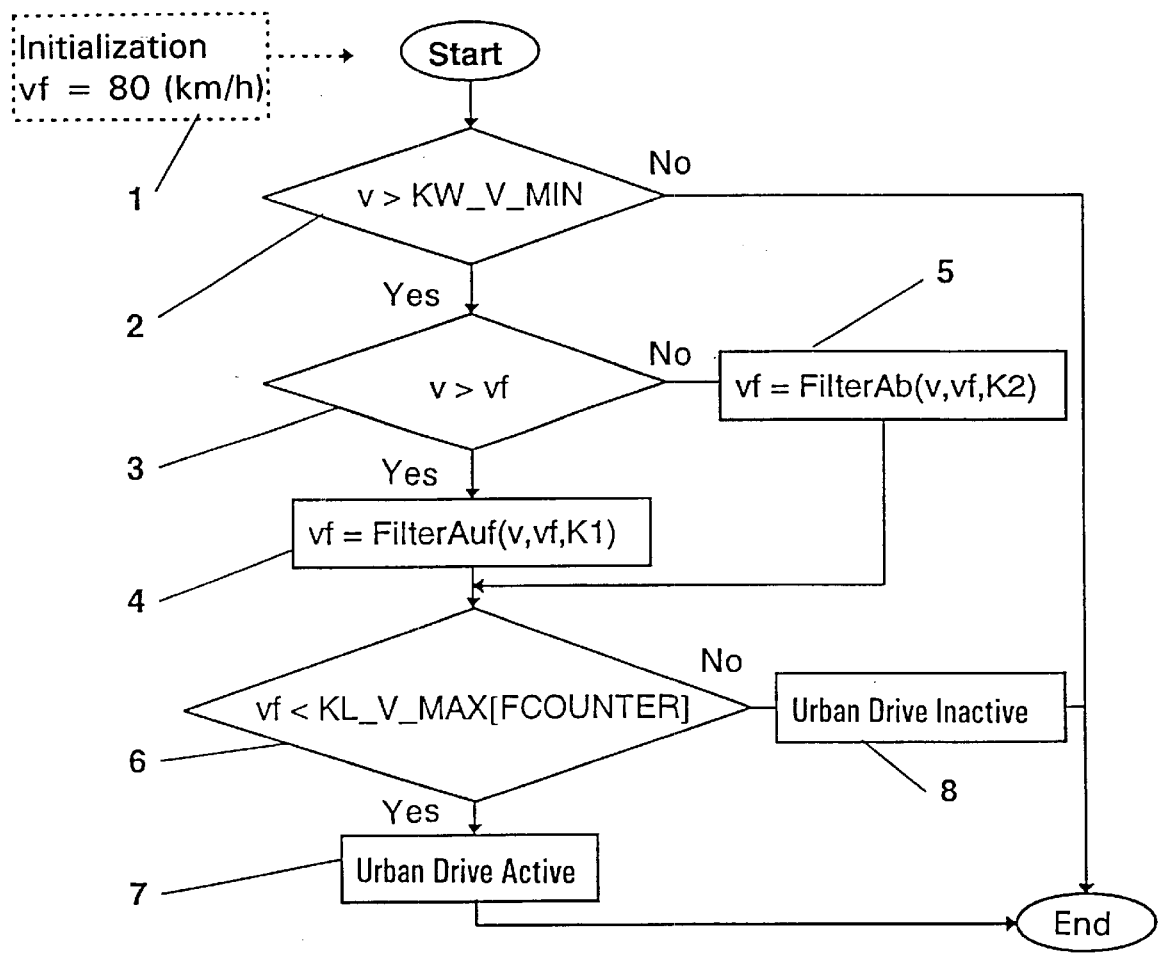
FIG. 1 is a program flow chart of one embodiment.

According to FIG. 1, the program flow chart is programmed in the electronic control device and will cyclically run through. The function is initialized in block 1, the driving speed characteristic vf is set, for example, at 80 km/h. Thereby when the engine is restarted, the driving does not immediately occur in the driving state "urban drive" is prevented. The driving speed characteristic vf is then formed by a time-delaying filter from measured driving speed values and slowly diminishes at low driving speeds.

In inquiry block 2, whether the driving speed v is higher than a lower driving speed limit value KW_V_MIN is tested. In the negative, the end of this program part is directly jumped to; in the affirmative, in inquiry block 3 whether the driving speed v is higher than the last valid value vf of the driving speed characteristic is tested. In the affirmative, the driving speed characteristic vf is sent to block 4 with a new value which results from the filter function FilterAuf (v, vf, K1). The filter function is carried out, e.g. as a low-path filter order, the delay time in the case v>vf being preferably adjusted to a value of about 2 to 4 s. It is hereby ensured that in acceleration from a closed place the urban driving state is quickly abandoned. If the driving speed v is lower than the last valid value vf of the driving speed characteristic, then a new value of the driving speed characteristic vf is determined in the block 5. The filtering occurs fundamentally the same as in the block 4, but a substantially longer delay time of about 5 to 10 min is adjusted. Hereby is obtained that the urban driving state be recognized at the place beginning not immediately but only delayed but with greater certainty.

Figure 2:
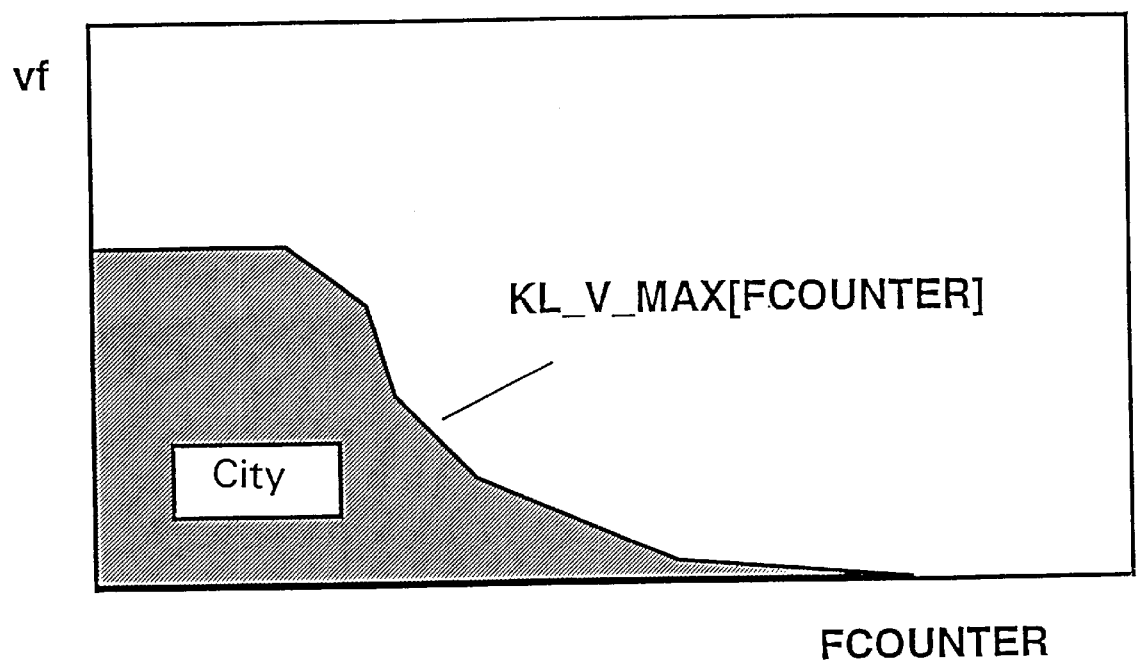
FIG. 2 is a diagram of a characteristic line for the upper limit value of the driving speed variable.

In inquiry block 6, the value of the driving speed characteristic vf is compared with an upper limit value KL_V_MAX which depends on the actual value FCOUNTER of the driving activity characteristic. The value KL_V_MAX is read out from a characteristic line stored in the electronic control device. The characteristic line KL_V_MAX [FCOUNTER] is graphically shown in FIG. 2. It divides the mode diagram in two ranges which the driving speed characteristic vf is plotted above the driving activity characteristic FCOUNTER. In the hatched area below, the upper limit value KL_V_MAX of the urban driving state is recognized. In this range an optimized driving program for the urban driving state is accessed which stands out, for example, by the fact that the starting is in the second gear or that the upshift and downshift characteristic lines are laid so that in the range of typical urban driving speed frequent reciprocal shifting is prevented. If the operating point is above the upper limit value KL_V_MAX, in block 8 it is recognized that the urban driving state is not present (FIG. 1).

The characteristic line KL_V_MAX assigns higher values to the driving activity characteristic FCOUNTER, lower limit values for the driving speed characteristic vf. In a sporting drive mode, the urban driving state is also abandoned at low speeds. In a formerly consumption-oriented drive mode, the driving activity characteristic FCOUNTER assumes lower values so that the range in which the urban driving state is recognized is only abandoned at high values of the driving speed characteristic vf.

| References | | |
|---|---|---|
| 1 block: initialization | v | driving speed |
| 2 inquiry block | vf | driving speed characteristic (filtered driving speed) |
| 3 inquiry block | | |
| 4 block | KW_V_MIN | lower limit value |
| 5 block | FilterAuf | time-delay filter |
| 6 inquiry block | FilterAb | time-delay filter |
| 7 block | KL_V_MAX | upper limit value |
| 8 block | FCOUNTER | driving activity characteristic |

What is claimed is:

1. An urban driving operating method for an electronically controlled automatic transmission in which a driving speed characteristic (vf) is determined and an urban driving state is recognized when the driving speed characteristic (vf) is within a given value range with an upper limit and a driving activity characteristic (FCOUNTER) determined in a continuous manner, the method comprising the steps of:

recognizing the urban driving state when the driving activity characteristic (FCOUNTER) is within a given value range with an upper limit; and accessing a driving program optimized for the urban driving state for as long as the urban driving state is recognized.

2. The method according to claim 1, further comprising the step of determining an upper limit value (KL_V_MAX) of the driving speed characteristic (vf), below which the urban driving state is recognized, according to an actual value of the driving activity characteristic, and assigning characteristic (FCOUNTER) lower limit values (KL_V_MAX) to higher values of the driving activity.

3. The method according to claim 1, further comprising the step of calculating, from measured driving speed values (v), the driving speed characteristic (vf) via a time delaying filter.

4. The method according to claim 3, further comprising the step of increasing a delay of a filter, when the value of the filtered driving speed characteristic (vf) is higher than the actual driving speed value (v), and decreasing a delay of a filter, when the value of the filtered driving speed characteristic (vf) is higher than the actual driving speed value (v), so that the urban driving state is only recognized with the delay, when proceeding from a high driving speed, once the driving speed of the limit value (KL_V_MAX) has fallen below and departed from a low driving speed, and quickly abandoning the driving state when the driving speed exceeds the limit value (KL_V_MAX).

5. The method according to claim 1, further comprising the step of recognizing the urban driving state only when the actual driving speed (v) is higher than a lower driving speed limit value (KW_V_MIN).

6. The method according to claim 1, further comprising the step of recognizing the urban driving state only when, during the same driving cycle, a minimum driving speed was previously reached.

7. The method according to claim 1, further comprising the step of allowing the driving speed characteristic (vf) to assume only values that are lower than a given maximum value.

8. The method according to claim 1, further comprising the step of determining a road gradient and recognizing the urban driving state only when the road gradient is within a presettable value range which is indicative of a substantially level road.

9. The method according to claim 1, further comprising the step of determining an elevated tractional resistance and recognizing the urban driving state only when the elevated tractional resistance is within a presettable value range which is indicative of a substantially level road.

10. The method according to claim 1, further comprising the step of determining one of a road gradient and an elevated tractional resistance and recognizing the urban driving state only when one of the road gradient and the elevated tractional resistance is within a presettable value range which is indicative of a substantially level road.

11. The method according to claim 1, further comprising the step of determining a number of braking operations of the vehicle per a desired time interval and recognizing the urban driving state only when the number of braking operations per the desired time interval exceed a given limit value.

12. The method according to claim 1, further comprising the step of detecting a position of the vehicle and establishing whether the vehicle position is within a confined location, and recognizing the urban driving state only when the vehicle position is detected within a confined location.

13. The method according to claim 10, further comprising the step of detecting the position of the vehicle by a navigation system and establishing whether the vehicle position is within a confined location via cartographic data.

* * * * *